United States Patent
Kain et al.

(10) Patent No.: US 11,572,081 B2
(45) Date of Patent: Feb. 7, 2023

(54) METHOD FOR OPERATING A SELF-PROPELLED VEHICLE, AND CONTROL SYSTEM FOR PERFORMING SUCH A METHOD

(71) Applicant: Volkswagen Aktiengesellschaft, Wolfsburg (DE)

(72) Inventors: Tobias Kain, Oberndorf/Melk (AT); Maximilian Wesche, Edemissen (DE); Hendrik Decke, Braunschweig (DE); Julian-Steffen Müller, Hannover (DE); Fabian Plinke, Hamburg (DE); Andreas Braasch, Wuppertal (DE); Johannes Heinrich, Cologne (DE); Timo Horeis, Hamburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 6 days.

(21) Appl. No.: 17/119,031

(22) Filed: Dec. 11, 2020

(65) Prior Publication Data
US 2021/0179144 A1    Jun. 17, 2021

(30) Foreign Application Priority Data
Dec. 12, 2019 (DE) ...................... 10 2019 219 464.8

(51) Int. Cl.
*B60W 60/00* (2020.01)
*B60W 50/023* (2012.01)
(Continued)

(52) U.S. Cl.
CPC ...... *B60W 60/0015* (2020.02); *B60W 40/105* (2013.01); *B60W 50/023* (2013.01); *B60W 50/045* (2013.01)

(58) Field of Classification Search
CPC ............ B60W 50/02; B60W 50/0205; B60W 50/0225; B60W 50/023; B60W 50/029;
(Continued)

(56) References Cited

U.S. PATENT DOCUMENTS

| | | | |
|---|---|---|---|
| 8,452,465 B1 * | 5/2013 | Sinha | G06F 11/143 365/189.08 |
| 2008/0033785 A1 | 2/2008 | Anke | 705/7.26 |

(Continued)

FOREIGN PATENT DOCUMENTS

| | | | |
|---|---|---|---|
| DE | 102012002280 A1 | 8/2012 | ............ B60R 16/02 |
| DE | 102013205285 A1 | 10/2013 | ............ B60W 50/02 |
| WO | 2019/238440 A1 | 12/2019 | ............ B22F 3/105 |

OTHER PUBLICATIONS

German Office Action, Application No. 102019219464.8, 6 pages.

*Primary Examiner* — Russell Frejd
*Assistant Examiner* — Sara J Lewandroski
(74) *Attorney, Agent, or Firm* — Slayden Grubert Beard PLLC

(57) ABSTRACT

The invention relates to a method for operating a self-propelled motor vehicle having a plurality of control units and a plurality of program codes for controlling the function of autonomous driving and possibly other functions of the self-propelled vehicle, wherein a plurality of program codes used for an autonomous driving mode are redundantly applied to at least two different control units. In doing so, the self-propelled motor vehicle is operated in an at least partially autonomous driving mode. In this mode, the functions directly needed to satisfy the passenger's wishes are ascertained and weighted corresponding to their relevance for satisfying the passenger's wishes. In so doing, the functions, or the scope of functions, are released depending on the achievement of a target achievement level.

14 Claims, 4 Drawing Sheets

(51) Int. Cl.
  *B60W 50/04* (2006.01)
  *B60W 40/105* (2012.01)
(58) Field of Classification Search
  CPC ......... B60W 50/032; B60W 2050/021; B60W 2050/0215; B60W 2050/022; B60W 2050/0292; B60W 2050/0295; B60W 2050/0297; B60W 60/001; B60W 60/0015; B60W 60/0016; B60W 60/0017; B60W 60/00186; B60W 60/0023; B60W 60/0025
  See application file for complete search history.

(56) References Cited

U.S. PATENT DOCUMENTS

| | | | |
|---|---|---|---|
| 2010/0235064 A1* | 9/2010 | Mallet | B60W 10/02 701/70 |
| 2012/0210160 A1* | 8/2012 | Fuhrman | G05B 19/0428 714/4.12 |
| 2018/0260240 A1 | 9/2018 | Kaku et al. | |
| 2019/0359207 A1* | 11/2019 | Ochida | G05D 1/02 |
| 2020/0201323 A1* | 6/2020 | Park | B60W 50/04 |
| 2021/0139033 A1* | 5/2021 | Hasegawa | B60W 30/182 |
| 2021/0163026 A1* | 6/2021 | Ochida | B60W 30/18163 |
| 2022/0315020 A1* | 10/2022 | Tagesson | B60W 50/023 |

* cited by examiner

METHOD FOR OPERATING A SELF-PROPELLED VEHICLE, AND CONTROL SYSTEM FOR PERFORMING SUCH A METHOD

CROSS-REFERENCE TO RELATED APPLICATIONS

This application claims priority to German Patent Application No. DE 10 2019 219 464.8, filed on Dec. 12, 2019 with the German Patent and Trademark Office. The contents of the aforesaid Patent Application are incorporated herein for all purposes.

TECHNICAL FIELD

The invention relates to a control system for controlling the operation of a self-propelled motor vehicle, in particular a driving system controlling the automatic driving of the motor vehicle, a motor vehicle, in particular an electrically driven motor vehicle with such a control system, as well as a computer program product.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Present-day vehicles already have numerous assistance systems that help the driver in numerous driving situations supported by computer. Such assistance systems can access sensors for detecting a great deal of measured data that greatly exceed the sensory perceptions of humans. Moreover, the speed of these assistance systems significantly exceeds human reaction time. Known driver assistance systems are for example lane departure warning systems, brake assistants in the context of pedestrian recognition, and adaptive cruise controls, in particular for traffic jam situations.

Through the use of such assistance systems, the autonomy of the driver with respect to his driving decisions is increasingly being transferred to the vehicle, or respectively to correspondingly operating control units. At the end of these developments is a self-propelled vehicle that can maneuver entirely without the intervention of a human. Fully-automated passenger transportation is possible using such a self-propelled vehicle.

The driving mode of a self-propelled automobile is controlled by a driving system which, in the context of the present application, is to be understood as a control unit in the broadest sense that is specially designed and configured for this task. This control unit is designed to automatically transversely and longitudinally guide the vehicle by using a plurality of input signals, in particular sensor data detected by the vehicle itself, as well as received communication data. Such controlling of automated transverse and longitudinal guidance poses complex calculation requirements on the driver assistance system which generally possesses algorithms, models and control functions for this purpose that are at least partially based on machine learning (artificial intelligence).

To safely operate an autonomous automobile, numerous software applications are required that interact with each other. However, the problem is that errors such as for example in the context of the software application or a computing node can cause some applications to no longer be executable. Depending on the importance of the application, this may have dramatic consequences for the safety of the passengers and other road users.

To prevent the dramatic consequences of errors that arise, the software applications may be redundantly executed in different computing nodes. The idea is that the redundant instances are executed in a passive mode. This means that they execute the same procedures as the active instances, but however do not interact with the executing systems.

Depending on the functional relevance of the corresponding function, this could lead to uncontrolled driving situations, a loss of comfort up to an endangerment of the passengers in the autonomously driving motor vehicle. It is known to redundantly design safety-relevant systems in order to reliably avoid hazardous driving situations.

The job of determining the assignment between instances of applications and computing nodes is nontrivial. The decision depends on many different parameters. For example, computing nodes only possess a limited amount of computing and memory resources. On the other hand, each application requires a certain amount of resources in order to function as planned. To ensure that all applications can be executed in the computing nodes installed in the vehicle, a multidimensional and complex application placement problem must be solved.

Hazardous situations from software or hardware errors can, as already noted, be (partially) prevented by redundant software design. The introduction of redundant application instances however increases the complexity of the application placement problem since additional parameters must be taken into account. For example, the minimum number of redundant instances can be indicated for each application. Moreover, the minimum degree of hardware segregation can be defined for each application. This parameter indicates the minimum number of different computing nodes in which the instances of the application must be executed. In this case, the number of available controlling units and the requirement for minimum hardware segregation with respect to the programs leads to a distribution problem.

Since the number of software applications that are necessary to operate an autonomous vehicle is rather high (about 100 applications are affected), numerous valid assignments between computing nodes and the application instance generally exist. However, not all valid assignments are equally "good". To select the best possible mapping, an optimization target must be formulated. The optimization target can for example be formulated so that mappings which enable as many computing nodes as possible to be shut down, give preference to those mappings that use all computing nodes with which the vehicle is equipped. In addition to this optimization target, various other target functions are conceivable that take into account other criteria.

During the operation of a vehicle, the placement of the application can change several times. For example after events such as the error of a computing node or the error of an application instance, it may be necessary to switch to a new application placement. In addition to these events, the recognition of a potential optimization possibility can also trigger the switchover to a new application placement.

SUMMARY

An object exists to increase the safety of an autonomously driving motor vehicle and reducing energy consumption, as well as presenting a method for operating a self-propelled vehicle in which safe and energy-saving operation of the vehicle is ensured.

This object is solved by the subject matter of the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
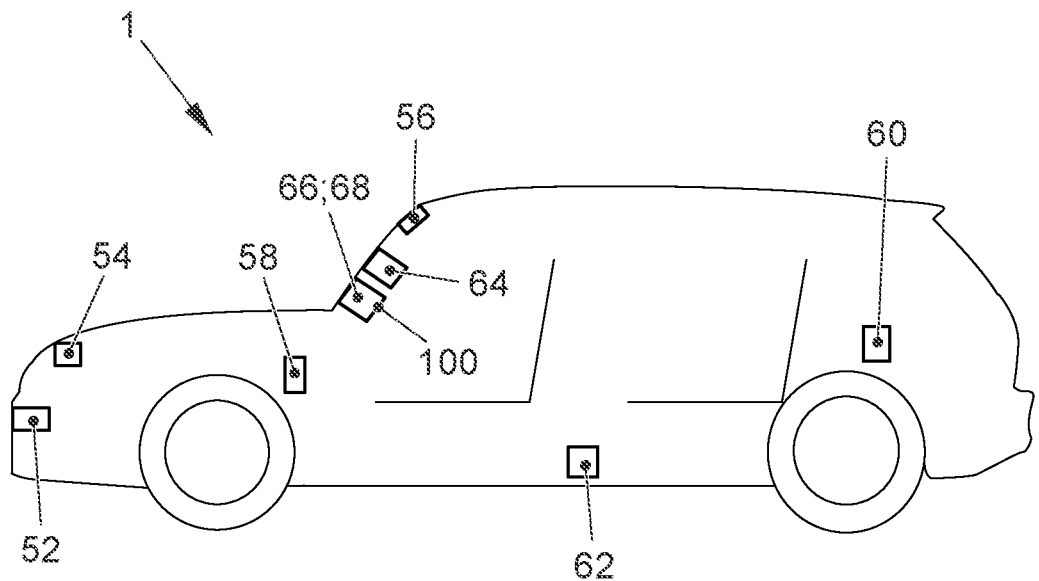
FIG. 1 shows a schematic representation of an exemplary system consisting of a motor vehicle with sensors and a control apparatus for performing an at least partially autonomous driving mode of the motor vehicle.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a method for operating a self-propelled motor vehicle having a plurality of control units and a plurality of program codes for controlling the functioning of autonomous driving and, if applicable, other functions of the self-propelled vehicle, wherein a plurality of program codes used for an autonomous driving mode are redundantly applied to at least two different control units. In doing so, the self-propelled motor vehicle is operated in an at least partially autonomous driving mode. In this mode, the functions directly needed to satisfy the passenger's wishes are ascertained and weighted corresponding to their relevance for satisfying the passenger's wishes. In doing so, the functions or the scope of functions are released depending on the achievement of a target achievement level. In doing so, the assignment of the active program codes to the control units is dynamic depending on a prioritization of the corresponding function. Accordingly, the computing power may be correspondingly adapted in order to always provide a sufficiently high safety reserve depending on the hazardous situation so that a failure of a control unit, or an error in the execution of a program code may be compensated without endangerment of the passengers of the motor vehicle or the surroundings of the motor vehicle. Since, in an autonomous driving mode, the system requirements increase for example with the driving speed and traffic density, the control system may be operated in a correspondingly energy efficient manner given low driving speeds and/or a low traffic density, and may be operated in a correspondingly maximally efficient manner given a high driving speed and/or high-traffic density in corresponding embodiments.

In doing so, the controlling units may in some embodiments be computing nodes of a computer that per se may execute a subprogram code. The program codes are also termed applications. The control units are alternatively also termed controlling units or computing nodes. The control system therefore enables maximally redundant and energy efficient control of a (partially) autonomous driving mode of a motor vehicle. This increases safety and lowers energy consumption, whereby the range of the motor vehicle is increased and the emissions produced by the motor vehicle may be reduced.

By means of the features presented in the dependent claims, beneficial improvements and nontrivial embodiments are possible of the method for controlling a motor vehicle presented.

In some embodiments, the entire scope of functions is released when the control system achieves the highest target achievement level. The system may therefore be operated with maximum performance in autonomous driving mode. Accordingly for example, the maximum driving speed possible in autonomous driving mode may be released only at the maximum target achievement level and is restricted in lower target achievement levels.

In some embodiments, a minimum number of redundancies is established for each function in order to release of the full scope of functions. In particular, safety-relevant functions have a higher priority and a higher weighting factor than comfort functions of the motor vehicle.

In some embodiments, the particular program code for fulfilling the function is executed by the most powerful, free control unit given an increased weighting of the function. This allows the reaction speed of the control system to be increased, which allows for example a faster reaction to external disturbances and hazardous traffic situations, for example given a higher driving speed.

In some embodiments, a minimum number of different control apparatuses on which the different functions are redundantly executed is established for each function. By distributing the program codes, in particular the safety-relevant program codes, to different control systems, it may be ensured that even if a complete controlling unit fails, the function may still be performed, and hazardous operating systems may therefore be reliably avoided.

The functions of a higher weighting level are in some embodiments configured with more redundancies than the functions of a lower weighting level. The multiple redundancy of the functions of the higher and highest weighting level may allow a failure of a control apparatus to not lead to hazardous traffic operating states, but instead be imperceptible to the passengers of the motor vehicle, or only perceptible as a restriction of driving comfort.

In some embodiments, the weighting level of the functions depends on the driving speed of the autonomously driving motor vehicle. By weighting the functions depending on the speed, the driving safety and/or driving comfort may be increased in some embodiments. Accordingly, in particular during a standstill of the motor vehicle, the comfort functions may be emphasized whereas with increasing driving speed, additional redundancies for the safety relevant driving functions may be added in order to always achieve a maximum possible target achievement level.

In some embodiments it is provided to activate additional control units when the requirements of the current target achievement level are no longer met. This may ensure that the control system is restored to the currently highest possible target achievement level within a short interval of time.

In some embodiments, the number of necessary redundancies to achieve a specific target achievement level rises with the increased weighting of the function. Accordingly, it may be ensured that the particularly important functions in the current driving mode are given a corresponding priority. The redundancies ensure that a failure of a sensor or a control unit, or a malfunction of the program code, does not lead to a hazardous driving situation.

In some embodiments, the computing power of the control apparatuses is assigned to the program codes for controlling the particular function such that a highest possible target achievement level is reached. This establishes the basis for a subsequent optimization in which individual control apparatuses may be deactivated to reduce energy consumption when the maximum target achievement level has been reached.

In some embodiments, the maximum target achievement level is reached in an initial state of the control apparatus. If it is assumed that, in an initial state, all program codes may be executed in a stable and reliable manner by the control apparatuses of the control system, the conditions for reaching the maximum target achievement level are met in this initial state.

According to some embodiments, the redundancies of functions of the lower weighting level are reduced, and the thereby-released computing power in the control units is assigned to the functions of the higher weighting level. This allows the energy consumption of the control system to be reduced, and if applicable allows control apparatuses no longer required for achieving the target to be deactivated.

In this case, it may be provided in some embodiments if the control units on which no active program codes are currently being executed are shut off to increase the energy efficiency of the control system. By shutting off individual control units, reserve capacity may be provided that may be reactivated in the event of an increase in system requirements in order to ensure performance of functions on the highest target achievement level. In doing so, the control units are for example switched to a standby mode to save energy, from which they may be reactivated within a short time and are fully operable.

Another exemplary aspect relates to a control system comprising a plurality of control apparatuses, wherein the control system is configured to execute such a method for operating a motor vehicle driving at least partially autonomously if a plurality of machine-readable program codes are executed by at least two control apparatuses of the control system. The method may correspond to the preceding aspect and/or one or more of its embodiments.

A vehicle performing the method according to the preceding aspect and/or one or more of its embodiments may have a driving system configured for the automatic driving mode of the vehicle. The driving system may for example be configured to longitudinally and/or transversely guide the vehicle in a fully automated manner. To accomplish this, the driving system for example accesses a plurality of sensor data detected by the vehicle, as well as communication data received by the vehicle. The driving system is for example designed to execute driver assistance functions up to fully automated driving. To accomplish this, the driving system may have control algorithms that are at least partially based on machine learning and for example have target functions and/or neural networks. To operate the driving system, function data may also be required that for example have parameters of a neural network or optimized function parameters. These function data are saved in the driving system of the vehicle as a function data record. At the beginning of the method according to some embodiments, a (relative) first function data record is always saved in the driving system of the vehicle.

A vehicle performing the method according to the first aspect and/or one or more of the embodiments described furthermore may have a control unit. This control unit is for example configured to communicate with the other components of the vehicle, for example with the first communication module and with the driving system, as well as possibly with sensors, and to coordinate their functions. The control unit may further allocate to a memory, or control it.

In some embodiments, the scope of functions of the driving system expands as the license level of the vehicle increases. In other words, the degree of automation of the driving mode expands as the license level of the vehicle increases. For example, the license levels of the vehicle are correlated with various levels of autonomous driving. For example, a vehicle in a delivered state has a license level of 0. Also, the license level of 0 corresponds to a level 0 degree of automation ("driver only"), according to which the driver continuously performs longitudinal and transverse guidance, and the driving system does not actively intervene in the driving mode.

In some embodiments, license level 1 corresponds to a level 1 degree of automation ("assisted"), according to which a driver permanently takes over longitudinal or transverse guidance, and the driving system takes over each of the other functions. Also, license level 2 corresponds to a level 2 degree of automation ("partially automated"), according to which a driver must permanently monitor the vehicle, and the driving system takes over longitudinal and transverse guidance in a specific application.

In some embodiments, license level 3 corresponds to a level 3 degree of automation ("highly automated") according to which a driver does not have to continuously monitor the vehicle but however must be potentially capable of taking over the control of the vehicle. According to the level 3 degree of automation and in some embodiments, the driving system also takes over longitudinal and transverse guidance in a specific application and furthermore independently recognizes limits of the driving system and, with a sufficient time reserve, asks the driver to take over control. License level 4 in some embodiments corresponds to a level 4 degree of automation ("fully automated"), according to which no driver is needed in a specific application, and the driving system fully autonomously handles the situation in a specific application.

In some embodiments, license level 5 corresponds to a level 5 degree of automation ("driverless"), according to which no driver is needed from the beginning to the end of a trip, and the driving system entirely takes over the task of driving in all applications. The above definitions correspond to the "five levels of autonomous driving" as defined by the German Association of the Automotive Industry (VDA).

The particular application includes road types, a speed range and environmental, or respectively environmental conditions.

Another exemplary aspect relates to a vehicle, in particular a passenger vehicle, with an internal combustion engine, electric motor or hybrid motor for performing the steps of a vehicle in the method according to the first aspect and/or one or more of the embodiments discussed. To accomplish this, the vehicle may have at least sensors for detecting environmental data, by means of which the control apparatuses of the control system are supplied with data for the autonomous driving mode.

Another exemplary aspect relates to a computer program comprising a program code for performing the steps of the discussed method for operating an at least partially autonomously driving motor vehicle when the program code of the computer program is executed on a computer.

The method steps of the method in some embodiments may be implemented by electrical or electronic parts or components (hardware), by firmware (ASIC), or achieved by executing a suitable program (software). In some embodiments, the method is achieved or respectively implemented by a combination of hardware, firmware, and/or software. For example, individual components for carrying out individual method steps are designed as a separately integrated circuit or arranged on a joint integrated circuit. Individual components configured to perform individual method steps are furthermore for example arranged on a (flexible) printed circuit carrier (FPCB/PCB), a tape carrier package (TCP), or another substrate.

The individual method steps of the method discussed herein are for example further designed as one or more processes that run on one or more processors in one or more electronic computing devices and are created when executing one or more computer programs. In this case, the computing devices are for example designed to work together with other components, for example a computer module, as well as one or more sensors, or respectively cameras, to achieve the functionalities described here. The instructions of the computer programs are for example stored in a memory such as for example a RAM element. The computer programs may however also be stored on a non-volatile storage medium such as for example a CD ROM, a flash memory, or the like.

A person skilled in the art will see that the functionalities of multiple computers (data processing devices) may be combined or may be combined in a single device or that the functionality of a specific data processing device may be distributed on a plurality of devices to execute the steps of the discussed method.

The various embodiments of the invention mentioned in this application may beneficially be combined with one another, unless designed otherwise in individual cases.

The invention will be explained in further exemplary embodiments below based on the associated drawings. Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation, in particular a block diagram, of an exemplary motor vehicle 1, in particular a two-track vehicle with an internal combustion engine, electric or hybrid motor. The motor vehicle 1 comprises a plurality of first sensors in particular a first sensor 52, a second sensor 54, and a third sensor 56. The first sensors 52, 54, 56 are configured to detect environmental data of the motor vehicle 1 and for example comprise a camera for detecting an image of an environment directly surrounding the motor vehicle 1, distance sensors such as for example ultrasonic sensors or LIDAR, for detecting distances to the objects surrounding the motor vehicle 1. The first sensors 52, 54, 56 transmit the environmental signals detected by them to control units 12, 14, 16, 18 of a control system 10 of the motor vehicle 1.

The motor vehicle 1 furthermore has a plurality of second sensors, in particular a fourth sensor 58, a fifth sensor 60 and a sixth sensor 62. The second sensors 58, 60, 62 are sensors for ascertaining status data relating to the motor vehicle 1 itself such as for example current position and movement information of the vehicle. The second sensors are consequently for example speed sensors, acceleration sensors, inclination sensors, sensors for measuring an insertion depth of a shock absorber, wheel speed sensors, or the like. The second sensors 58, 60, 62 transmit the status signals detected by them to the control units of the motor vehicle 1. In particular, the second sensors 58, 60, 62 transmit their measuring results directly to a control unit 12, 14, 16, 18 of the control system 10 of the motor vehicle 1.

The motor vehicle 1 further has the control system 10 that is configured for the completely autonomous driving mode, in particular longitudinal and transverse guidance, of the motor vehicle 1. The control system 10 has a navigation module 64 that is configured to calculate routes between a starting and a target point, and to ascertain the maneuvers to be performed along this route by the motor vehicle 1. The navigation module 64 may further be configured to perform specific maneuvers of the motor vehicle 1 such as for example parking and unparking maneuvers. Moreover, the control system 10 comprises an internal memory 66 that communicates with the navigation module 64, for example via a suitable data bus. In particular, a model, a neural network and/or a target function are saved on the internal memory 66 that are at least partially based on machine learning. Furthermore, function data for the model, the neural network and/or the target function are saved in the internal memory 66 as a function data record. The functionality of the control system 10 may be controlled by a control unit and particularly depending on a license level of the motor vehicle 1.

The control system 10 is configured to perform the steps of the motor vehicle 1 in the method according to the teachings herein. In this case, the control system 10 correspondingly performs the steps of the method by means of the controlling units 12, 14, 16, 18, or controls the other components of the motor vehicle 1. For this purpose, the control units 12, 14, 16, 18 for example each have an internal memory 66 and a CPU 68 which communicate with each other, for example via a suitable data bus. Moreover, the control units 12, 14, 16, 18 of the control system 10 are in a communicating connection with at least one of the first sensors 52, 54, 56 and the second sensors 58, 60, 62, and possibly other control apparatuses of the motor vehicle, for example to control the heater or air conditioning system of the motor vehicle, a radio, navigation system or other information or entertainment systems. The communication is carried out for example through one or more particular CAN connections, one or more particular SPI connections, or other suitable data connections.

Figure 2:
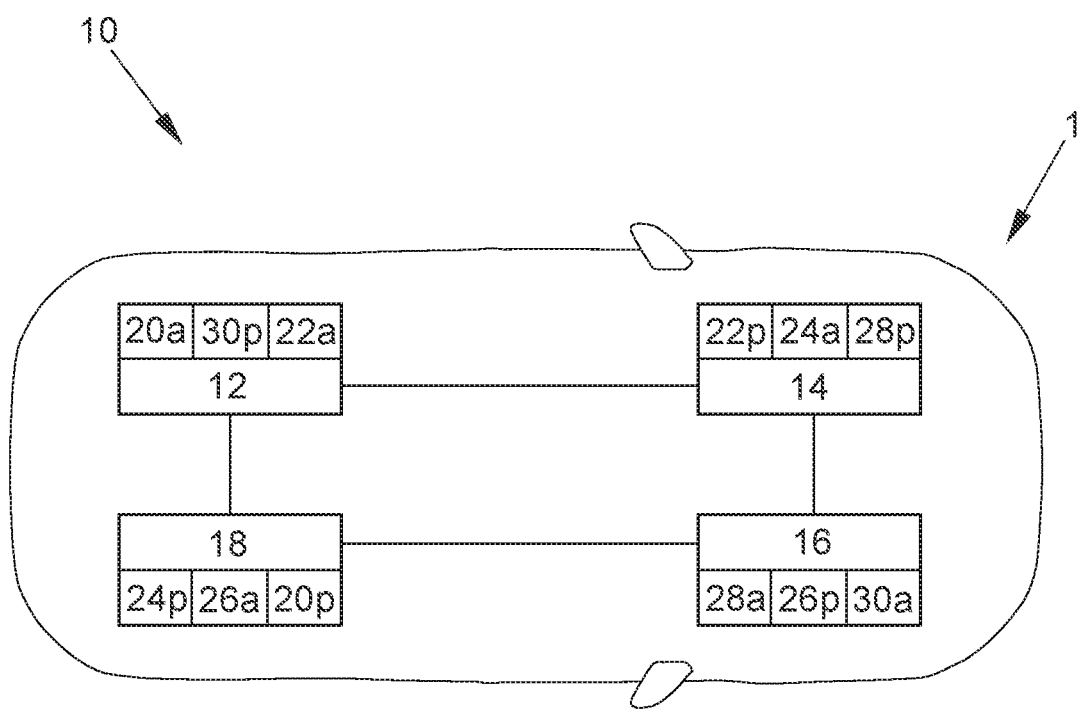
FIG. 2 shows an exemplary control system with a plurality of controlling units that execute a plurality of program codes for controlling an at least partially autonomous driving mode.

FIG. 2 shows a schematic configuration of a control system 10 for controlling an at least partially autonomous, for example fully autonomous, motor vehicle 1. The control system 10 comprises four control units 12, 14, 16, 18, of which at least one program code 20, 22, 24, 26, 28, 30 is executed to perform a partially autonomous or fully autonomous driving mode of the motor vehicle 1. Each program code 20, 22, 24, 26, 28, 30 is redundantly applied to two different controlling units 12, 14, 16, 18. A program code 20a, 22a, 24a, 26a, 28a, 30a is actively executed by a controlling unit 12, 14, 16, 18 and evaluated to control the motor vehicle 1, whereas the redundant program 20p, 22p, 24p, 26p, 28p, 30p remains passive and is only integrated into the controlling of the motor vehicle 1 when the formerly active program 20a, 22a, 24a, 26a, 28a, 30a can no longer be evaluated to control the motor vehicle 1 due to an error or a failure of the particular controlling unit 12, 14, 16, 18.

Figure 3:
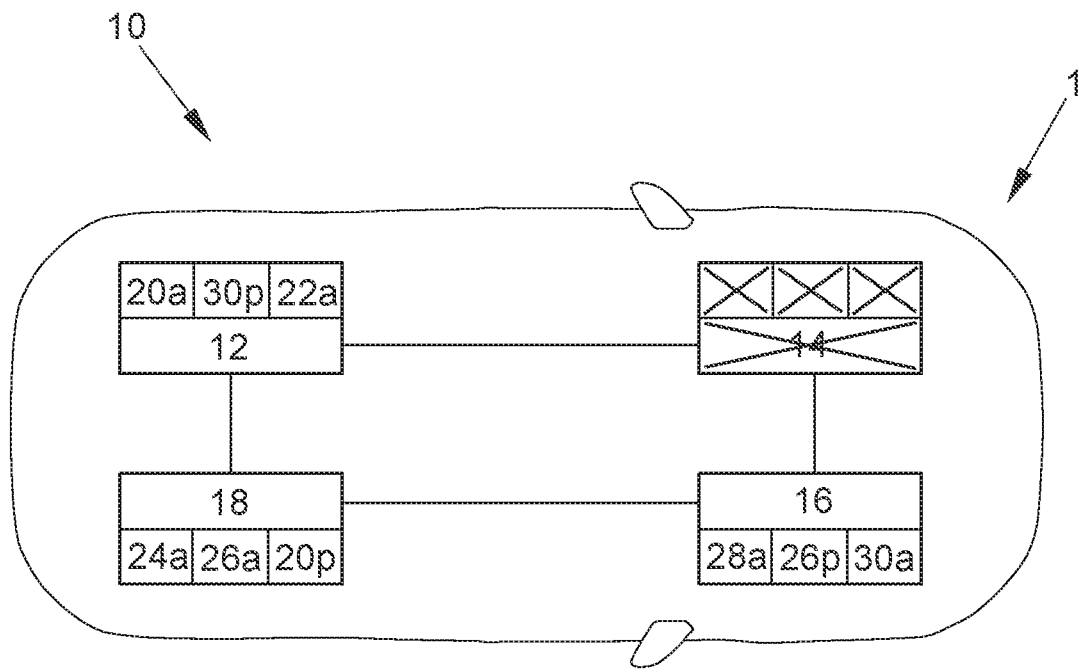
FIG. 3 shows an exemplary control system with a plurality of controlling units in the event of a failure of a controlling unit or the crashing of a program code, wherein the failed function is taken over by a redundant program code on another control apparatus.

During the operation of a motor vehicle 1, the placement of the program codes 20, 22, 24, 26, 28, 30 can change several times. For example after events such as the error of a controlling unit 12, 14, 16, 18 or the error of an application instance, it may be necessary to change to a new application placement. In addition to these events, the recognition of a potential optimization possibility may trigger the switchover to a new controlling unit 12, 14, 16, 18. FIG. 3 shows such an instance in an example of a failure of the second controlling unit 14. The third program code 24a was executed in the initial state by the second controlling unit 14. After a failure of this second controlling unit 14 or a program crash of the third program code 24a hitherto actively executed on the second control device 14, the third program code 24p is activated on the third controlling unit 16 and evaluated for further controlling the motor vehicle 1. Dramatic driving situations from a lack of controlling the motor vehicle 1 can thereby be avoided.

To enable an optimization of the active program codes 20a, 22a, 24a, 26a, 28a, 30a, it is necessary to recognize the current driving situation and the current performance of the control system 10. In so doing, the performance of all software applications 20, 22, 24, 26, 28, 30, all control apparatuses 12, 14, 16, 18 and other hardware, in particular the sensors 52, 54, 56, 58, 60, 62, is referenced for system reasons.

The following examples illustrate this dependency:

Let us assume that the motor vehicle 1 is an electrically driven automobile that conveys a passenger to an important meeting, and the battery of the motor vehicle 1 is almost empty. In such a situation, the goal of the timely arrival at the desired location is more important than the entertainment of the passenger. In order to increase the range of the motor vehicle 1, all applications can therefore be stopped that serve the purpose of entertainment. Consequently, some control apparatuses 12, 14, 16, 18 can be shut down, which saves energy.

Let us imagine a motor vehicle 1 that is stuck in a traffic jam. Since the motor vehicle 1 is scarcely moving, redundant instances of driving functions can be stopped. Resources are therefore released with which for example an application can be executed that helps improve the flow of traffic.

Due to a system crash, one-half of the control apparatuses 12, 14, 16, 18 installed in the motor vehicle no longer function. Since the remaining control apparatuses 12, 14, 16, 18 do not provide sufficient resources to execute all program codes 20, 22, 24, 26, 28, 30 of the applications that were executed before the crash, a new application placement plan must be calculated. The goal of placement optimization is to depict all applications that are necessary to safely bring the motor vehicle 1 to a standstill in order to ensure the safety of the passengers and other road users.

In order to enable an optimization of the application placement based on the current context, let us add a level above the configuration diagram. This layer divides the configuration graph into several target achievement levels 42, 44, 46, 48, 50. The target achievement levels 42, 44, 46, 48, 50 are defined so that the safety and availability of the system increases as the target achievement level 42, 44, 46, 48, 50 increases. Consequently, the target achievement level 50 can be considered the "best" target achievement level, which means that this target achievement level 50 is the most desirable. On the other hand, the target achievement level 42 is the "worst" level. Since the minimum safety requirements can no longer be met on this level, a fail-safe system 40 must take control of the motor vehicle 1 and safely bring it to a standstill.

Features (such as minimum redundancy requirements) are defined for each target achievement level 42, 44, 46, 48, 50 that an application placement on this level must satisfy. Moreover, the target achievement levels 42, 44, 46, 48, 50 must build on each other, i.e., an application placement of the target achievement level x must also perform the features that are necessary for all target achievement levels y, wherein $1<=y<x$. Another criterion that must be taken into account when defining the target achievement levels 42, 44, 46, 48, 50 is that edges (remember that edges correspond to events) must no longer overlap as a level border between two target achievement levels 42, 44, 46, 48, 50. This means that it must be prevented that an occurring event (such as the error of a control apparatus 12, 14, 16, 18) causes a worsening of the target achievement level 42, 44, 46, 48, 50 by two or more target achievement levels 42, 44, 46, 48, 50. Consequently, an event can only cause a drop to the level below the current level, i.e., jumps of several target achievement levels 42, 44, 46, 48, 50 are impermissible.

Figure 4:
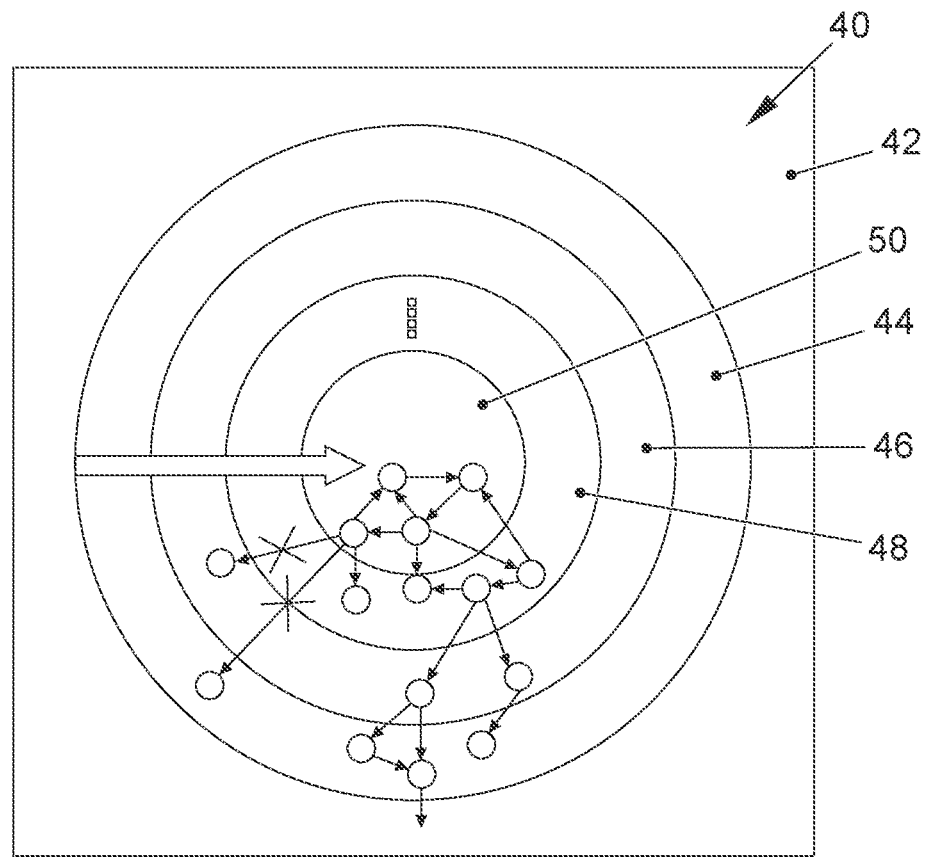
FIG. 4 shows an exemplary flowchart for achieving a highest possible target achievement level in the execution of a method according to the teachings herein.

Moreover we define a target function for each target achievement level 42, 44, 46, 48, 50. As already mentioned, level N is the most desirable level. Consequently, the goal of all other target achievement levels 42, 44, 46, 48 is to reach the target achievement level N 50 as quickly as possible. This can be achieved by a target function that prioritizes the placement of executed program codes 20, 22, 24, 26, 28, 30 and performs as many features as required from the next target achievement level 44, 46, 48, 50. Once the target achievement level N 50 is reached, the application placement can be optimized based on the current driving situation. Such an optimization is illustrated in FIG. 4.

When an application instance fails, the number of instances of the corresponding program code 20, 22, 24, 26, 28, 30 is decremented by 1. If the number of executed program codes 20, 22, 24, 26, 28, corresponds precisely with the minimum required number of instances of the target achievement level N, the control system 10 is reset to the target achievement level N−1. Otherwise, i.e., if the application exceeds the minimum required number of instances, the system remains on level N.

An error in the runtime environment causes all application instances executed in the runtime environment to also fail. Since, for each executed program code 20, 22, 24, 26, 28, 30, the minimum level of the hardware segregation is the same as the minimum number of application instances, we can assume that, for applications that precisely correspond to the minimum requirements of the target replacement level N, at most one instance is affected by the runtime environment error. Consequently, this type of error can be reduced to the error of one application instance. As we have already explained above, our approach avoids jumps of several target achievement levels 42, 44, 46, 48, 50, if one application instance fails. Consequently, multilevel jumps are also excluded in the event of a runtime environment error.

An error of a control apparatus 12, 14, 16, 18 causes all application instances executed by this control apparatus 12, 14, 16, 18 to also fail. As already mentioned, the minimum level of hardware segregation for each application corresponds to the minimum number of application instances. We can therefore assume that, for applications which precisely correspond to the minimum requirements of level N, at most one instance is affected by an error of the control apparatus 12, 14, 16, 18. Consequently, this type of error can be reduced to the error of one application instance. Accordingly, multi-level jumps in the target achievement level can also be excluded in the event of a failure of a control apparatus 12, 14, 16, 18.

FIGS. 5a-5d describe the execution of a method according to the teachings herein in a motor vehicle 1 with six control apparatuses 12, 14, 16, 18, 70, 72. In so doing, a total of four different program codes 20, 22, 24, 26 are executed by the control system 10, wherein the applications belong to the following priority classes:

highest: first program code 20
high: second program code 22
medium: third program code 24
low: fourth program code 26.

Figure 5A:
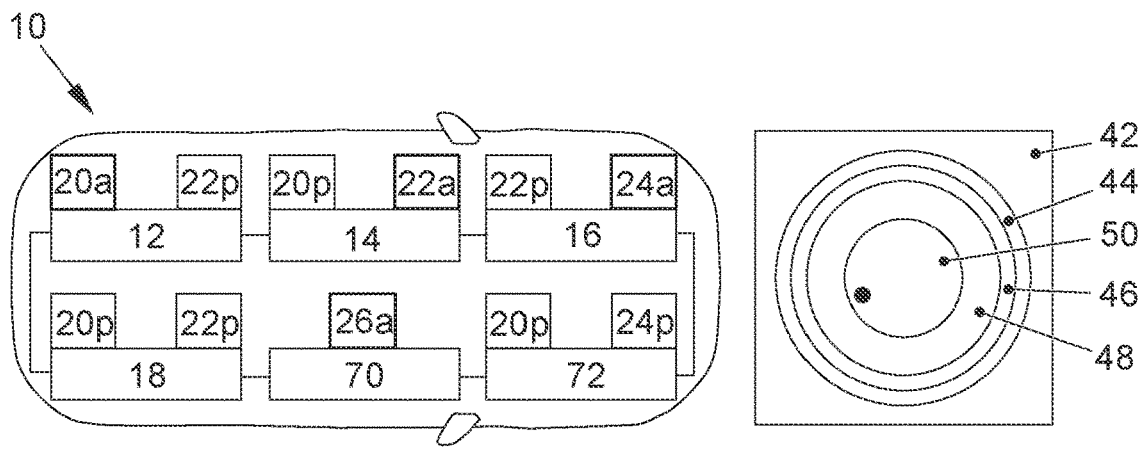
FIGS. 5a-5d show additional exemplary flow charts for achieving a highest possible target achievement level in the event of a program crash of a program code and/or failure of a controlling unit.
Figure 5B:
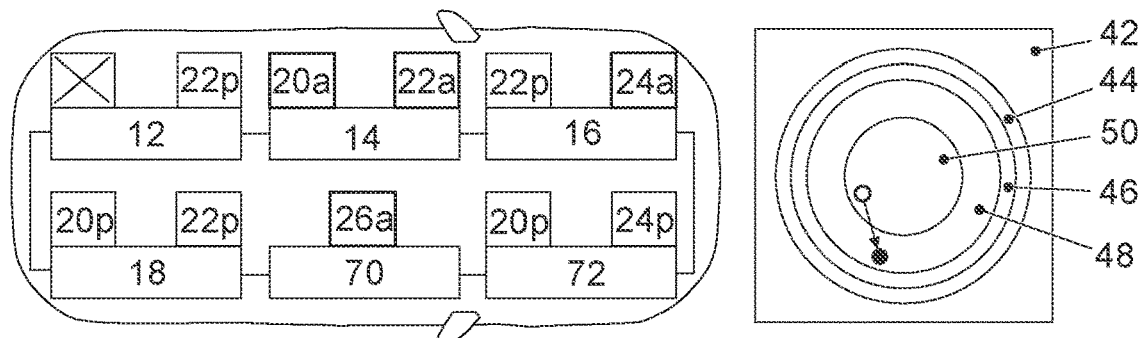

In the initial configuration, the control system 10 is in an optimum state since it satisfies all requirements of the target achievement level 5. Then let us assume that the active instance of program code 20a fails as shown in FIG. 5b). By switching to one of the passive instances of program code 20p, a total loss of program code 20 can be avoided.

Since the target achievement level 5 requires that the minimum number of instances as well as the minimum level of hardware segregation is four for each application with the highest priority, a failure of the active program code 20a causes an active application instance to be missing in order to satisfy the requirements of target achievement level 5. Consequently, the subsequent configuration is not an element of target achievement level 5, but rather an element of target achievement level 4.

Figure 5C:
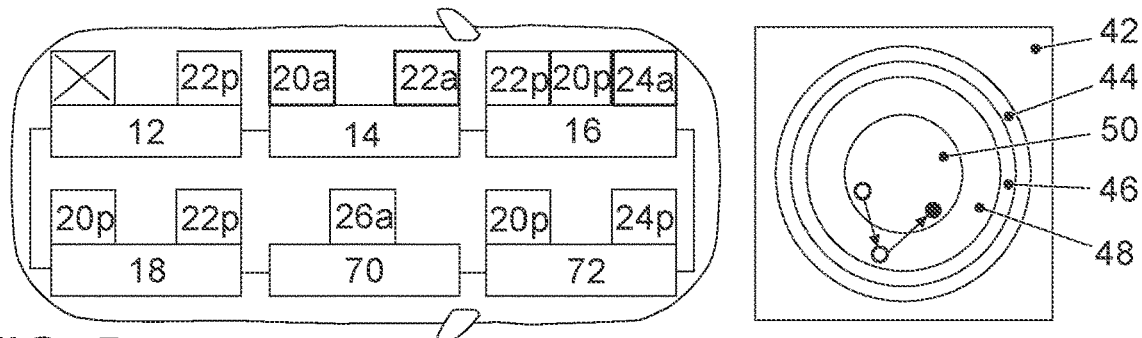

As already mentioned, the goal of all non-optimum target achievement levels 42, 44, 46, 48 is to perform restoration processes so that the control system 10 reaches the highest possible target achievement level 50. As shown in FIG. 5c), the target achievement level 5 can be restored by starting a new passive instance 20p of program code 20.

Figure 5D:
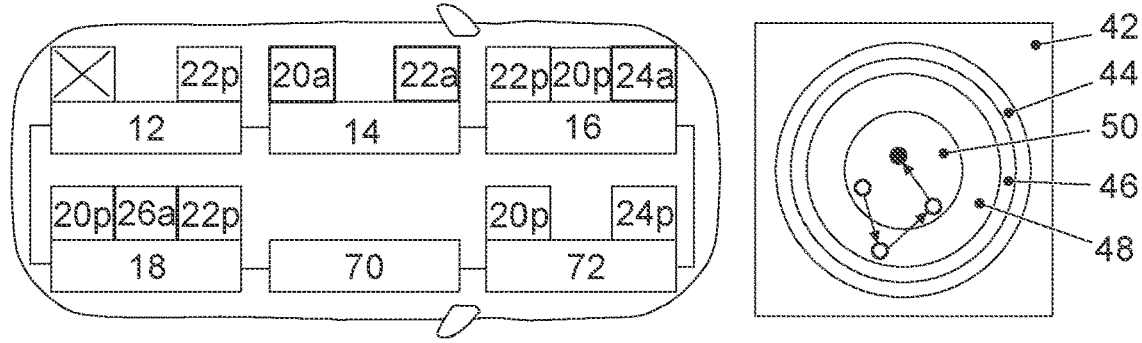

Once the control system is again on target achievement level 5, optimizations can be performed based on the current driving situations. Under the assumption that the goal is to increase the range of the vehicle, a change to an application placement is possible that only uses a portion of all available control apparatuses 12, 14, 16, 18, 70, 72. Consequently, as is shown in FIG. 5d), the active instance 26a of program code 26 is moved to another controlling unit 18 so that the controlling unit 70 can be shut down. Apart from this optimization, other energy-saving measures can be performed as long as the control system 10 is on target achievement level 5.

Figure 6:
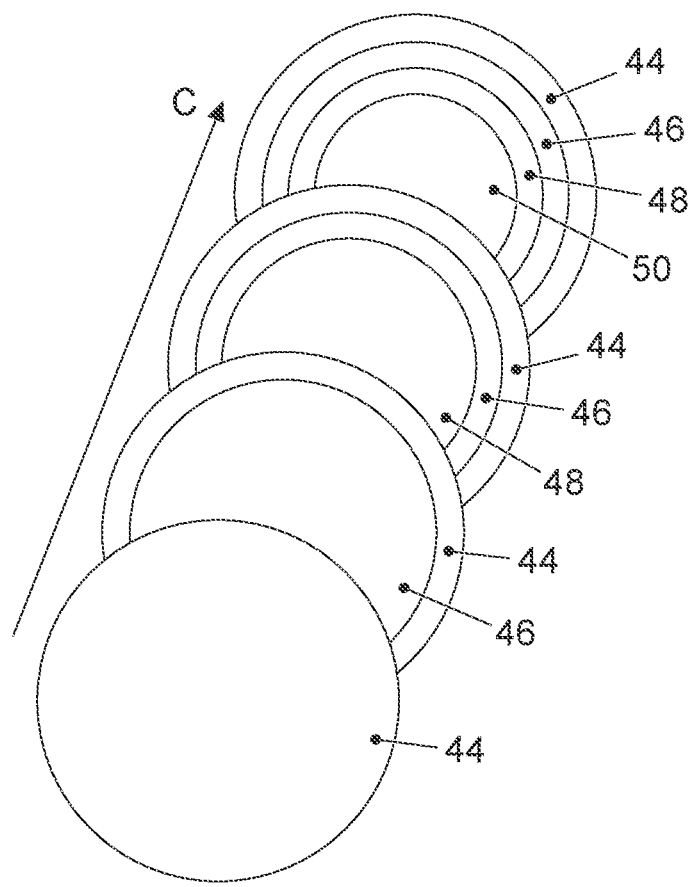
FIG. 6 shows an exemplary flowchart for dynamic, context-based optimization.

FIG. 6 depicts a flowchart that shows how, as in the overall context c, the requirements for a specific function of the autonomously operable motor vehicle 1 can be weighted more strongly as the requirement for this system increases, and a higher target achievement level 44, 46, 48, 50 is accordingly requested to safely execute this function. An example of such a dynamic adaptation of the required target achievement level are the requirements for an autonomous driving mode of the motor vehicle 1 with increasing driving speed. Whereas at a standstill or at very low driving speeds, in particular at driving speeds around the walking tempo, the first target achievement level 44 ensures sufficient operating safety of the motor vehicle 1, the requirements on the necessary target achievement level increase as the driving speed increases and the reaction times accordingly shorten, and the effects of a system failure potentially become more critical. Alternatively, in a trip through the desert or through a very cold region, the requirements on the vehicle climate control system can also rise given an increasing deviation from a comfortable temperature of approximately 18-28° C. in order to very reliably prevent damage to the health of the passengers from overheating or hypothermia. In this case, other functions may be restricted in favor of this function in order to ensure a maximal level of safety for the passengers in the interior of the motor vehicle 1. Furthermore, if the battery charge is low or the fill level of the fuel tank is low, the priority of reaching the target point corresponding to the next charging station or the next gas station can increase so that other functions are restricted corresponding to the overall context c.

Figure 7:
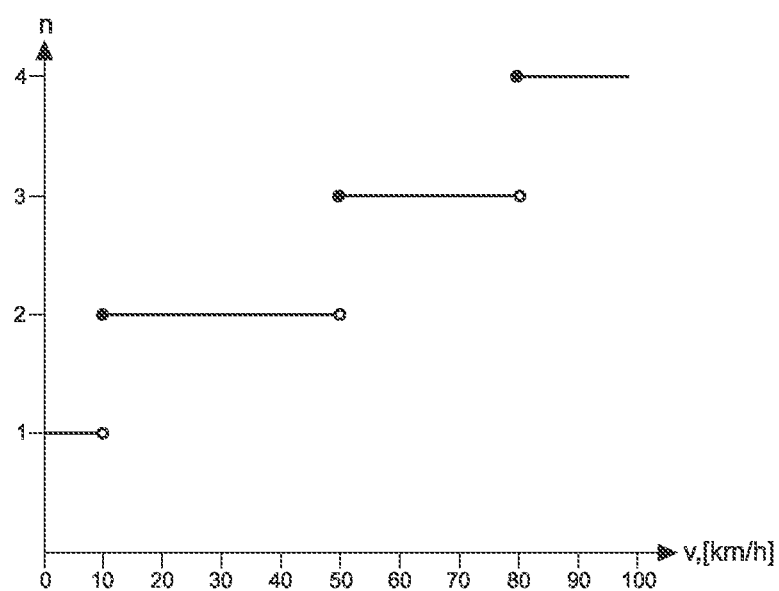
FIG. 7 shows the maximum driving speed in an autonomous driving mode depending on the achievement of the target achievement level.

With the example of the driving speed of an autonomously operated motor vehicle 1, FIG. 7 shows a correlation between the necessary target achievement level n and the driving speed v of the motor vehicle 1. As the driving speed increases, the reaction speed of the system must rise in order to ensure a safe, autonomous driving mode of the motor vehicle 1. Consequently as the speed increases, the safeguarding against failures of control functions must increase. Depending on the target achievement level and therefore the stability of the control system, it is therefore established which target achievement level must be reached at a minimum in order to release an autonomous driving mode in the next highest speed range. This ensures that the control system has sufficient redundancy even in the event of a failure of a sensor, a control device or software program to enable a safe driving mode of the motor vehicle 1.

In this case, the priorities are shifted in association with the weighting of the function so that in this operating state, less relevant functions such as for example the control of the entertainment system or the vehicle climate control system are weighted less strongly as the speed increases, and the functions for performing an autonomous driving mode are weighted higher, whereas at very low speeds or at a standstill, in particular at a standstill in a traffic jam, a shift in the priorities can occur in favor of other functions such as for example the vehicle climate control system and/or the passenger entertainment system.

LIST OF REFERENCE NUMERALS

1 Motor vehicle
10 Control system
12 First control unit
14 Second control unit
16 Third control unit
18 Fourth control unit
20 First program code 22 Second program code
24 Third program code
26 Fourth program code
28 Fifth program code
30 Sixth program code
32 Lowest weighting level
34 Middle weighting level
36 High weighting level
38 Highest weighting level
40 Fail-safe system
42 First target achievement level
44 Second target achievement level
46 Third target achievement level
48 Fourth target achievement level
50 Fifth target achievement level
52 First sensor
54 Second sensor
56 Third sensor
58 Fourth sensor
60 Fifth sensor
62 Sixth sensor
64 Navigation module
66 Internal memory
68 CPU
70 Fifth control unit
72 Sixth control unit
100 Computer program

The invention claimed is:

1. A method for operating a self-propelled motor vehicle with a control system with a plurality of control units, the control system being configured with a plurality of functions, comprising at least functions of autonomous driving, and with multiple target achievement levels for different driving modes, wherein for each target achievement level, a minimum required number of redundancies is defined for the plurality of functions; wherein not two redundancies of a given function are executed by one control unit of the plurality of control units; the method comprising:
operating the self-propelled motor vehicle in an at least partially autonomous current driving mode;
determining a necessary target achievement level for the current driving mode;
determining, whether the control system can be operated in the necessary target achievement level based on the minimum required number of redundancies for each of the plurality of functions;
in case it is determined that the control system cannot be operated in the necessary target achievement level, bringing the motor vehicle to a standstill.

2. The method of claim 1, comprising: before bringing the motor vehicle to a standstill, conducting a restoration process, aiming to restore the minimum required number of redundancies for each of the plurality of functions based on the necessary target achievement level for the current driving mode.

3. The method of claim 2, wherein the restoration process comprises determining, whether it is possible to start one or more redundancies of at least a first function of the plurality of functions while maintaining that not two redundancies of a given function are executed by the one control unit.

4. The method of claim 3, comprising, in case it is possible to start the one or more redundancies of the first function:
starting the one or more redundancies;
determining, that the control unit can be operated in the necessary target achievement level; and
operating the self-propelled motor vehicle in the at least partially autonomous current driving mode.

5. The method of claim 3, comprising, in case it is not possible to start the one or more redundancies of the first function:
determining, that the control unit cannot be operated in the necessary target achievement level; and
bringing the motor vehicle to a standstill.

6. The method of claim 1, wherein the necessary target achievement level for the current driving mode depends on the driving speed of the motor vehicle.

7. The method of claim 6, wherein the minimum required number of redundancies increases with the increasing driving speed of the motor vehicle.

8. The method of claim 1, wherein all of the plurality of functions are enabled when the control system operates in a maximum target achievement level of the plurality of target achievement levels resulting in a maximum functional performance of the motor vehicle.

9. The method of claim 8, wherein the maximum target achievement level is achieved in an initial state of the control system.

10. The method of claim 1, comprising: shutting off one or more of the plurality of control units in which no functions are currently being executed to increase an energy efficiency of the control system.

11. The method of claim 1, comprising:
optimizing use of the plurality of control units by the plurality of functions based on the minimum required number of redundancies of the necessary target achievement level for the current driving mode, so that a maximum number of control units result in which no functions are currently being executed; and
shutting off the control units in which no functions are currently being executed to increase an energy efficiency of the control system.

12. A control system comprising a plurality of control units, wherein the control system is configured to perform the method of claim 1 when a plurality of machine-readable program codes are executed by at least two control units of the control system.

13. A motor vehicle having a control system configured to perform the method of claim 1.

14. A non-transitory medium comprising a computer program with a program code for performing the steps of the method of claim 1 when the program code is executed on a computer or control unit.

* * * * *